United States Patent
Froelicher et al.

(10) Patent No.: US 10,250,578 B2
(45) Date of Patent: Apr. 2, 2019

(54) INTERNET KEY EXCHANGE (IKE) FOR SECURE ASSOCIATION BETWEEN DEVICES

(71) Applicant: QUALCOMM Incorporated, San Diego, CA (US)

(72) Inventors: Jeffree Froelicher, San Diego, CA (US); Nicholas Amuchastegui, Thornton, CO (US)

(73) Assignee: QUALCOMM Incorporated, San Diego, CA (US)

(*) Notice: Subject to any disclaimer, the term of this patent is extended or adjusted under 35 U.S.C. 154(b) by 122 days.

(21) Appl. No.: 15/040,841

(22) Filed: Feb. 10, 2016

(65) Prior Publication Data

US 2017/0126645 A1    May 4, 2017

Related U.S. Application Data (60) Provisional application No. 62/250,351, filed on Nov. 3, 2015.

(51) Int. Cl.
*H04L 29/06* (2006.01)

(52) U.S. Cl.
CPC ............ *H04L 63/061* (2013.01); *H04L 63/08* (2013.01); *H04L 63/123* (2013.01); *H04L 63/164* (2013.01)

(58) Field of Classification Search
CPC ..... H04L 63/061; H04L 63/08; H04L 63/123; H04L 63/164
See application file for complete search history.

(56) References Cited

U.S. PATENT DOCUMENTS

| | | | |
|---|---|---|---|
| 7,542,573 B2 | 6/2009 | Ogawa et al. | |
| 8,289,970 B2* | 10/2012 | Swander | H04L 63/02 370/395.2 |
| 9,021,577 B2* | 4/2015 | Song | H04L 63/18 726/14 |
| 2005/0256975 A1* | 11/2005 | Kaniz | H04L 49/90 709/250 |
| 2006/0168210 A1* | 7/2006 | Ahonen | H04L 63/0442 709/225 |
| 2013/0297940 A1* | 11/2013 | Chan | H04L 9/0841 713/171 |
| 2016/0182463 A1* | 6/2016 | Suram | H04L 63/061 713/153 |
| 2016/0212098 A1* | 7/2016 | Roch | H04L 63/029 |
| 2016/0277358 A1* | 9/2016 | Ambati | H04L 63/1466 |

(Continued)

OTHER PUBLICATIONS

International Search Report and Written Opinion—PCT/US2016/055353—ISA/EPO—dated Nov. 16, 2016.

(Continued)

*Primary Examiner* — Joseph P Hirl
*Assistant Examiner* — Sayed Aresh Beheshti Shirazi
(74) *Attorney, Agent, or Firm* — Hunter Clark PLLC (57) ABSTRACT

Aspects may relate to performing an Internet Key Exchange (IKE) to create an IPsec security association (SA) between a first device and a second device based upon both an authentication header (AH) and an encapsulating security payload (ESP), free of creating a child security association. Information exchange may then be allowed between the first device and the second device based upon the IPsec SA.

25 Claims, 5 Drawing Sheets

(56) References Cited

U.S. PATENT DOCUMENTS

2017/0034213 A1* 2/2017 Murgia .................. H04L 63/02

OTHER PUBLICATIONS

Kaufman C., et al., "Internet Key Exchange Protocol Version 2 (IKEv2)", rfc 5996, Internet Engineering Task Force, IETF; Standard, Internet Society (ISOC) 4, Rue Des Falaises CH-1205 Geneva, Switzerland, XP015073005, Sep. 14, 2010 (Sep. 14, 2010), pp. 1-138, [retrieved on Sep. 14, 2010].
Kent S., et al., "Security Architecture for the Internet Protocol", IETF: RFC 2401, Nov. 1998, pp. 1-66.
Nir Y., et al., "A Childless Initiation of the Internet Key Exchange Version 2 (IKEv2) Security Association (SA); rfc 6023", Internet Engineering Task Force, IETF; Standard, Internet Society (ISOC) 4, Rue Des Falaises CH-1205 Geneva, Switzerland, XP015073043, Oct. 11, 2010 (Oct. 11, 2010), pp. 1-7, [retrieved on Oct. 11, 2010] the whole document.
Kent S., "IP Authentication Header," BBN Technologies, Standards Track, Dec. 2005, 34 Pages.
Harkins D., et al., "The Internet Key Exchange (IKE)", Nov. 1, 1998, pp. 1-41, XP002165435.

* cited by examiner

INTERNET KEY EXCHANGE (IKE) FOR SECURE ASSOCIATION BETWEEN DEVICES

CROSS REFERENCE TO RELATED APPLICATIONS

The present application claims priority to U.S. Provisional Patent Application No. 62/250,351, filed Nov. 3, 2015, entitled "Internet Key Exchange (IKE) for Secure Association Between Devices," the content of which is hereby incorporated by reference in its entirety for all purposes.

BACKGROUND

Field

The present invention relates to an Internet Key Exchange for secure association between devices.

Relevant Background

Internet Protocol Security (IPsec) provides transparent security services for IP communications, protects TCP/IP communications from tampering and eavesdropping, and protects against network attacks. IPsec provides access control, connectionless integrity, data origin authentication, anti-replay service, and confidentiality. IPsec may comprise a series of protocols for IP data security that may include Internet Key Exchanges (IKEs) and algorithms for authentication and encryption. The two ends using IPsec for packet transmission may be called IPsec peers. The connection between these two peers may be called an IPsec tunnel or IPsec connection.

IPsec uses security associations (SAs) to protect packets between two peers. A SA is a set of elements including security protocols, encapsulation modes, encryption algorithms, shared keys, and key lifetime. An SA may be created manually (Manual) or through IKE negotiation. A pair of IPsec peers such as two network nodes or devices perform IKE negotiation to negotiate security protocols, exchange IPsec authentication and encryption keys, and manage the negotiated keys.

More recent versions of IP Security protocols include options to support optional Authentication Headers (AHs) and Encapsulated Security Payloads (ESPs) based on IPsec protocols for end to end security solutions. AH provides authentication and integrity protection for the entire packet including sources and destination IP addresses. ESP provides confidentiality by encrypting the payload and can optionally offer authentication and integrity protection for the payload but not for the entire packet. The configuration for these headers is typically done via Internet Key Exchange (IKE). However, the latest IP Security protocols have limited support for both the AH and ESP options.

SUMMARY

Aspects may relate to performing an Internet Key Exchange (IKE) to create an IPsec security association (SA) between a first device and a second device based upon both an authentication header (AH) and an encapsulating security payload (ESP), free of creating a child security association. Information exchange may then be allowed between the first device and the second device based upon the IPsec SA.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

As used herein, the terms "device", "peer", "computing system", or "computing device" may be used interchangeably and may refer to any form of computing device including but not limited to laptop computers, desktop computers, personal computers, servers, tablets, smartphones, televisions, home appliances, cellular telephones, watches, wearable devices, Internet of Things (IoT) devices, personal television devices, personal data assistants (PDA's), palm-top computers, wireless electronic mail receivers, multimedia Internet enabled cellular telephones, Global Positioning System (GPS) receivers, wireless gaming controllers, receivers within vehicles (e.g., automobiles), interactive game devices, notebooks, smartbooks, netbooks, mobile television devices, system on a chip (SoC), or any type of computing device or data processing apparatus.

Figure 1:
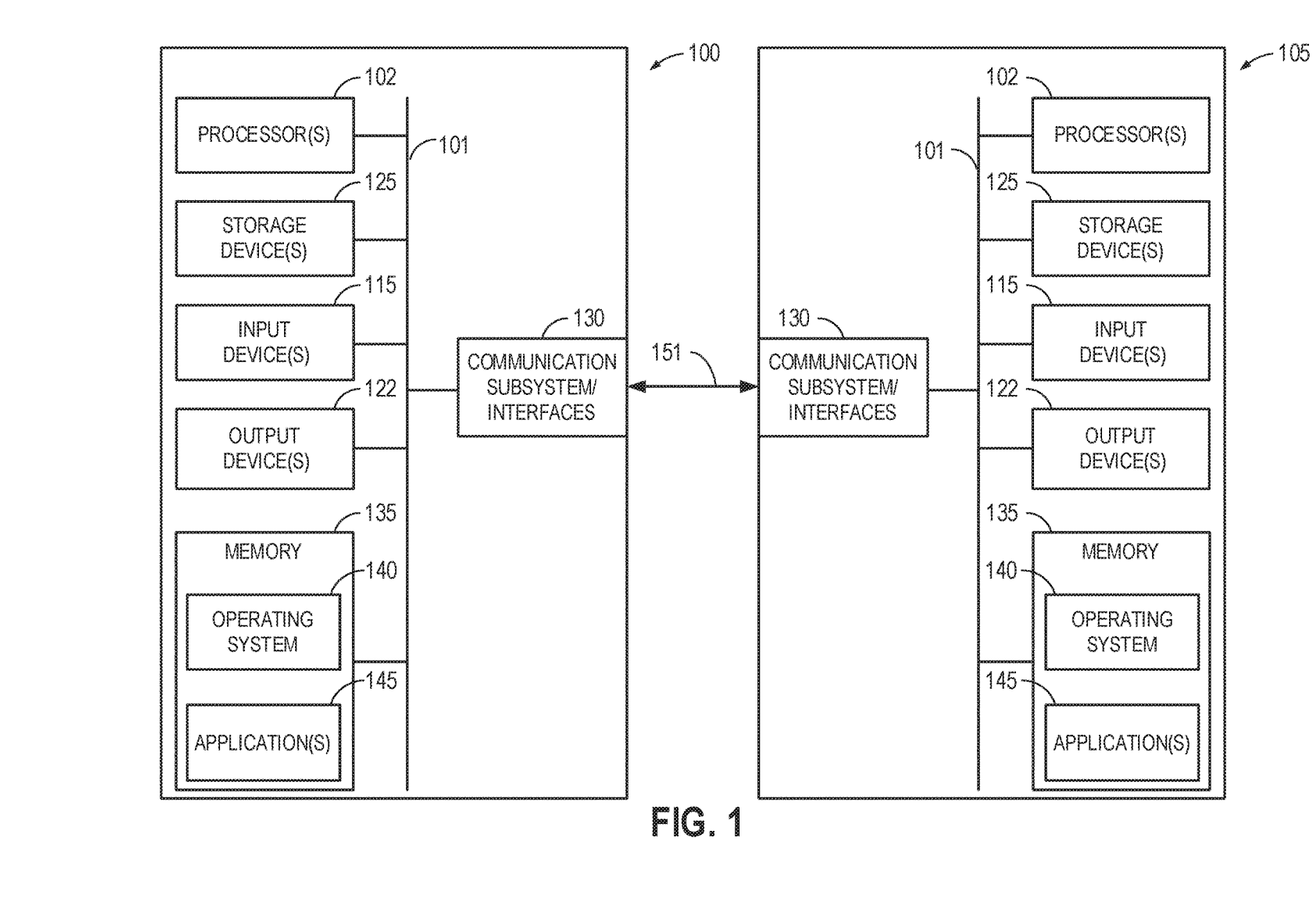
FIG. 1 is a diagram of a pair of devices with which embodiments may be practiced.

Two example devices 100 and 105 that may be in communication with one another (e.g., peer to peer communication) through a link 151 to perform an Internet Key Exchange (IKE), as will be hereinafter described in detail, are illustrated in FIG. 1. Devices 100 and 105 may each comprise hardware elements that can be electrically coupled via a bus 101 (or may otherwise be in communication, as appropriate). The hardware elements may include one or more processors 102, including without limitation one or more general-purpose processors and/or one or more special-purpose processors (such as digital signal processing chips, graphics acceleration processors, and/or the like); one or more input devices 115 (e.g., keyboard, keypad, touchscreen, mouse, etc.); and one or more output devices 122 (e.g., display device, speaker, printer, etc.). Additionally, devices 100 and 105 may include a wide variety of sensors. Sensors may include: a clock, an ambient light sensor (ALS), a biometric sensor (e.g., blood pressure monitor, etc.), an accelerometer, a gyroscope, a magnetometer, an orientation sensor, a fingerprint sensor, a weather sensor (e.g., temperature, wind, humidity, barometric pressure, etc.), a Global Positioning Sensor (GPS), an infrared (IR) sensor, a proximity sensor, near field communication (NFC) sensor, a microphone, a camera, or any type of sensor.

Devices 100 and 105 may further include (and/or be in communication with) one or more non-transitory storage devices 125, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

Devices 100 and 105 may also include a communication subsystem and/or interface 130, which may include without limitation a modem, a network card (wireless or wired), a wireless communication device and/or chipset (such as a Bluetooth device, an 802.11 device, a Wi-Fi device, a WiMax device, cellular communication devices, etc.), and/or the like. The communications subsystem and/or interfaces 130 may permit data to be exchanged between devices 100 and 105 through an appropriate link 151 (wireless or wired) through suitable networks, devices, computer systems, etc.

In some embodiments, devices 100 and 105 may further comprise a working memory 135, which can include a RAM or ROM device, as described above. Devices 100 and 105 may include firmware elements, software elements, shown as being currently located within the working memory 135, including an operating system 140, applications 145, device drivers, executable libraries, and/or other code. In one embodiment, an application may be designed to implement methods, and/or configure systems, to implement embodiments, as described herein. Merely by way of example, one or more procedures described with respect to the method(s) discussed below may be implemented as code and/or instructions executable by a device (and/or a processor within a device); in an aspect, then, such code and/or instructions can be used to configure and/or adapt a device 100 or 105 to perform one or more operations in accordance with the described methods, according to embodiments described herein.

A set of these instructions and/or code may be stored on a non-transitory computer-readable storage medium, such as the storage device(s) 125 described above. In some cases, the storage medium might be incorporated within a computer system, such as devices 100 and 105. In other embodiments, the storage medium might be separate from the devices (e.g., a removable medium, such as a compact disc), and/or provided in an installation package, such that the storage medium can be used to program, configure, and/or adapt a computing device with the instructions/code stored thereon. These instructions might take the form of executable code, which is executable by the devices 100 and 105 and/or might take the form of source and/or installable code, which, upon compilation and/or installation on devices 100 and 105 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, firmware, software, or combinations thereof, to implement embodiments described herein. Further, connection to other computing devices such as network input/output devices may be employed.

Aspects may relate to an Internet Key Exchange (IKE) for secure association between devices 100 and 105. In one aspect, an Internet Key Exchange (IKE) to create an IPsec security association (SA) between first device 100 and second device 105 may be performed based upon both an authentication header (AH) and an encapsulating security payload (ESP) via link 151, free of creating a child security association. Information exchange may then be allowed between the first device 100 and the second device 105 based upon the SA via link 151. As one example, processor 102 of first device 100 may be configured to perform an IKE based SA with second device 105 (via interfaces 130 and link 151) based upon both an AH and ESP, as will be described in more detail hereinafter. Further, processor 102 of second device 105 may be configured to perform the IKE based SA process with the first device 100 based upon interaction with the first device via interface 130 such that the IKE based SA process is successful and information may be exchanged between the first and second devices 100 and 105 based upon the IPsec SA. Various examples will be hereinafter described.

IP Security (IPsec) services via the SA provide confidentiality, data integrity, access control, and data source authentication to IP datagrams. As an example, these types of services may be provided by maintaining a shared state between the first and second device 100 and 105 IP datagrams. This state defines the specific services provided to the IP datagrams and which cryptographic algorithms will be used to provide the services and the keys used as inputs to the cryptographic algorithms. The Internet Key Exchange (IKE) protocol may be used to establish this shared state. IKE protocol performs mutual authentication between two parties (e.g., the first and second device 100 and 105) and also establishes the IKE security association (SA) that includes shared secret information that can be used to efficiently establish IPsec SAs and establish sets of cryptographic algorithms to be used by the SAs to protect the traffic that they carry. As an example, an initiator proposes the set of cryptographic algorithms used to protect a SA. An Internet Key Exchange Security Association may be called an "IKE_SA". All IKE communications may consist of pairs of messages: a request and a response. The pair is known as an exchange.

The messages that establish the IKE_SA may be an initial exchange "IKE_SA_INIT". The IKE_SA then can securely perform "IKE_AUTH" exchanges (referring to IKE Authentication exchanges) to create the IPsec SA. Subsequent exchanges that establish a child IPsec SA may be referred to as "CREATE_CHILD_SA". Further, Information exchanges may then occur. In a common case, there first is a single IKE_SA_INIT exchange and a single IKE_AUTH exchange using a total of four messages to establish the IPsec SA. The IKE_SA_INIT exchanges should be completed prior to any other exchange type. Next, the IKE_AUTH exchanges should be completed. Following this any number of CREATE_CHILD_SA exchanges and Information exchanges may follow in any order between authenticated pair endpoints (e.g., first and second device 100 and 105 (e.g., peers)). As will be described, IKE message flow typically consists of a request followed by a response. It is the responsibility of the requester to ensure reliability. If the response is not received within a timeout interval, the requester needs to retransmit the request or abandon the connection. The first request/response of an IKE session negotiates the security parameters of the IKE_SA, sends nonces, and Diffie-Hellman values. The second request response, IKE_AUTH transmits identities, proves knowledge of the secrets corresponding to the two identities, and sets up an IPsec SA. All messages after the initial exchange are cryptographically protected using the negotiated cryptographic set of the first two messages of the IKE exchange. Subsequent exchanges may be used CREATE_CHILD_SA and to perform Information exchanges between the first and second devices 101 and 105 (e.g., peers).

More recent versions of IP Security protocols include options to support optional Authentication Headers (AHs) and Encapsulated Security Payloads (ESPs) based on IPsec protocols for end to end security solutions. AH provides authentication and integrity protection for the entire packet including sources and destination IP addresses. ESP provides confidentiality by encrypting the payload and can optionally offer authentication and integrity protection for the payload but not for the entire packet. The configuration for these headers is typically done via Internet Key Exchange (IKE). However, the latest IKE implementations do not currently allow for both the AH and ESP options.

Figure 2:
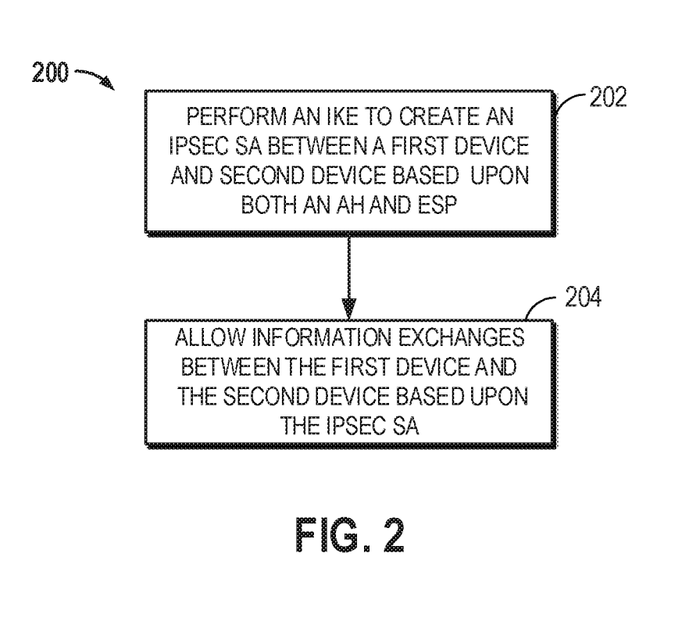
FIG. 2 is a flow diagram of performing an IKE process to create an IPsec SA.

With brief additional reference to FIG. 2, a process 200 is illustrated to provide an Internet Key Exchange (IKE) for an IPsec security association (SA) between devices 100 and 105. At block 202, an Internet Key Exchange (IKE) may be performed to create an IPsec SA between first device 100 and second device 105 based upon both an authentication header (AH) and an encapsulating security payload (ESP) via link 151, free of creating a child security association. At block 204, information exchange may then be allowed between the first device 100 and the second device 105 based upon the IPsec SA via link 105.

As previously described, as one example, processor 102 of first device 100 may be configured to perform an IKE process to establish an IPsec SA with second device 105 (via interfaces 130 and link 151) based upon both an AH and ESP. Further, processor 102 of second device 105 may be configured to perform the IKE process with the first device 100 based upon interaction with the first device via interface 130 such that the IKE process is successful and information may be exchanged between the first and second devices 100 and 105. Various examples will be hereinafter described.

Examples of transform types and valid modes previously referred to and hereafter referred to include: Encryption Algorithm (ENCR)=IKE and ESP; Pseudorandom Function (PRF)=IKE; Integrity Algorithm (INTEG)=IKE, AH, optional in ESP; and Diffie-Hellman Group (D-H)=IKE, optional in AH and ESP; and Extended Sequence Numbers (ESN)=AH and ESP Initial Phase. It should be appreciated that each SA can have multiple proposals but only one proposal is chosen by a Responder. Further, each proposal can have multiple transforms. Multiple transforms of the same type are thought of as options. The SA to be used may be identified by the Security Policy Indicator (SPI) number. The IKE establishes the IPsec SA Databases (SAD) and SPIs. Also, SAs can be revoked by either endpoint.

Figure 3:
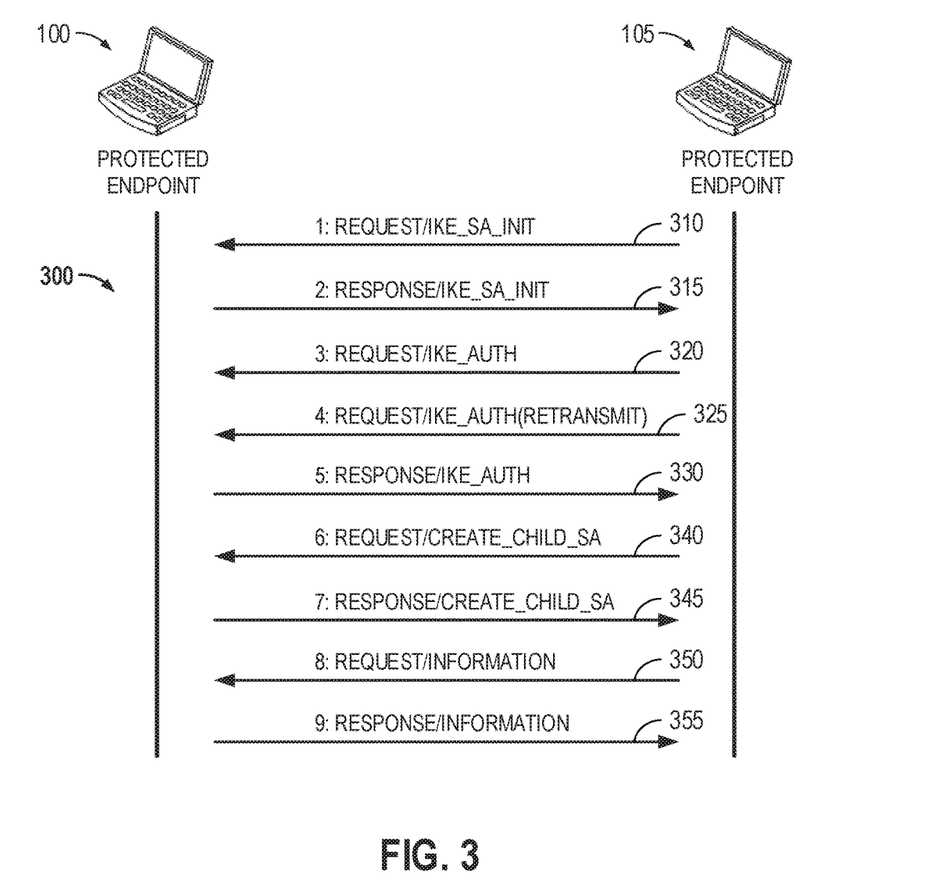
FIG. 3 is a diagram showing an IKE process in which a child SA is created based upon an encryption algorithm utilizing an ESP.

With additional reference to FIG. 3, an IKE is described in which a child SA is created based upon an encryption algorithm utilizing the ESP. In this example process 300, second device 105 requests an IKE_SA_INIT 310 from first device 100 and first device 100 responds with an IKE_SA_INIT 315 message to the second device 105. In this IKE_SA_INIT sequence, an IKE is setup. The following transform types may be setup: ENCR, PRF, INTEG, and D-H during the IKE_SA_INIT sequence. A notification message to use the transport mode may be sent.

Next, second device 105 request an IKE_AUTH 320 from first device 100 and first device 100 responds with an IKE_AUTH message 330 to the second device 105. The IKE_AUTH 325 may be retransmitted. In this IKE_AUTH sequence, an AH SA is setup. Further, INTEG and ESN transforms are set. A notification to use the transport mode may be set.

Additionally, second device 105 requests a CREATE_CHILD_SA 340 from first device 100 and first device 100 responds with CREATE_CHILD_SA message 345 to the second device 105. In this CREATE_CHILD sequence, an ESP SA is setup. Further, the ENCR transform is used. A notification to use the transport mode may be sent.

Afterwards, information requests 350 from the second device 105 to the first device 100 may be made and information responses 355 may be transmitted back from the first device 100 to the second device 105. In this way, information exchanges between the first and second devices 100 and 105 may occur based upon the IPsec AH and ESP SAs. It should be appreciated that changes do not need to be made to existing IPsec protocols utilizing the previously described IKE process. Also, it should be appreciated that processor 102 of first device 100 may be configured to perform the previously described IKE process with second device 105 (via interfaces 130 and link 151) and likewise the processor 102 of second device 105 may be configured to perform the previously described IKE process with the first device 100 based upon interaction with the first device via interface 130 and link 151 such that the IKE process is successful and information may be exchanged between the first and second device 100 and 105 based upon the IPsec SA.

Figure 4:
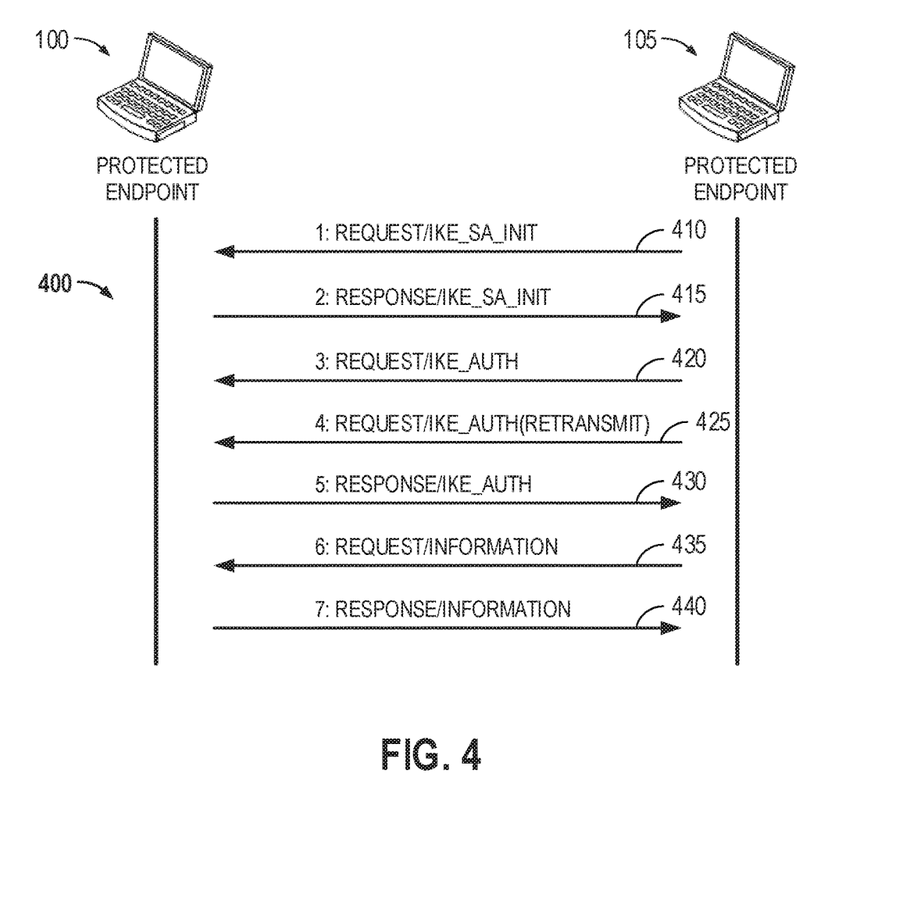
FIG. 4 is a diagram showing an IKE process in which IKE authentication is performed utilizing both an AH and an ESP.

With additional reference to FIG. 4, an IKE process is described in which an IKE authentication sequence is performed utilizing both an AH and an ESP, free of creating a child security association. In this example process 400, second device 105 request an IKE_SA_INIT 410 from first device 100 and first device 100 responds with an IKE_SA_INIT 415 message to the second device 105. In this IKE_SA_INIT sequence, an IKE is setup. The following transform types may be setup: ENCR, PRF, INTEG, and D-H during the IKE_SA_INIT sequence. A notification message to use the transport mode may be sent.

Next, second device 105 request an IKE_AUTH 420 from first device 100 and first device 100 responds with an IKE_AUTH message 430 to the second device 105. The IKE_AUTH 425 may be retransmitted. In this IKE_AUTH sequence, an IPsec SA is setup that includes both AH and ESP features, which operates as a new AH and ESP mode to indicate use of both the AH and the ESP. In particular, INTEG, ENCR, and ESN transforms are set. The INTEG and ESN are set in relation to AH and ENCR is set in relation to ESP. Thus, in this embodiment, in the IKE_AUTH: AH is used in the INTEG algorithm; AH is used in the ESN; and ESP is used in the ENCR algorithm. It should be appreciated that this SA is based upon a new AH and ESP mode in the previously described IKE authentication sequence. Adding this new mode allows for using both AH and ESP. Support for this new mode will need to be addressed in Internet Standards. In some embodiments, dual AH and ESP SAs may be utilized. Also, a notification message to use the transport mode may be sent.

Afterwards, information requests 435 from the second device 105 to the first device 100 may be made and information responses 440 may be transmitted back from the first device 100 to the second device 105. In this way, information exchanges between the first and second devices 100 and 105 may occur based upon the IPsec SA. It should be appreciated that this IKE process provides a quick set up time and only minimal changes may be needed to existing IPsec protocols utilizing the previously described IKE process. It should be noted that the previously described IKE process utilizing the IKE Authentication sequence and new mode of FIG. 4 is significantly faster than the Child SA methodology of FIG. 3, because Child SA messages are not needed thereby reducing request/response RTT. In some embodiments, dual SAs may be utilized with IKE authentication sequence of FIG. 4. Also, it should be appreciated that processor 102 of first device 100 may be configured to perform the previously described IKE process with second device 105 (via interfaces 130 and link 151) and likewise the processor 102 of second device 105 may be configured to perform the previously described IKE process with the first device 100 based upon interaction with the first device via interface 130 and link 151 such that the IKE based SA process is successful and information may be exchanged between the first and second device 100 and 105 based upon the IPsec SA.

Figure 5:
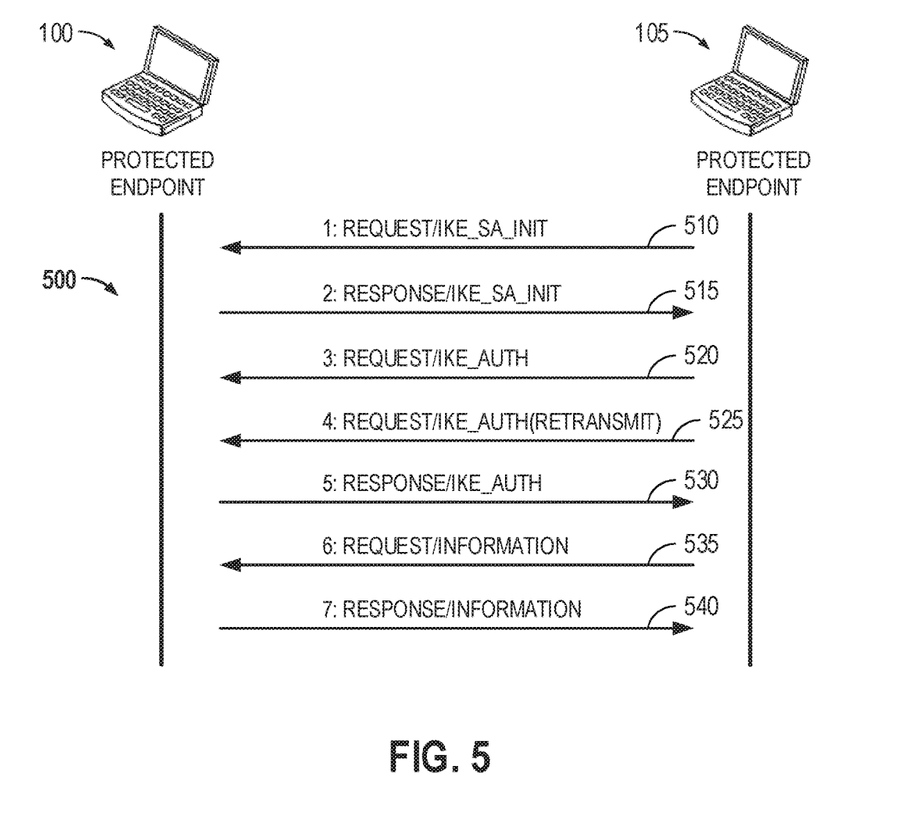
FIG. 5 is a diagram showing an IKE process in which IKE authentication is performed utilizing both an AH and an ESP.

With additional reference to FIG. 5, an IKE process is described in which an IKE authentication sequence is performed utilizing both an AH and an ESP, free of creating a child security association. In this example process 500, second device 105 request an IKE_SA_INIT 510 from first device 100 and first device 100 responds with an IKE_SA_INIT 515 message to the second device 105. In this IKE_SA_INIT sequence, an IKE is setup. The following transform types may be setup: ENCR, PRF, INTEG, and D-H during the IKE_SA_INIT sequence. A notification message to use the transport mode may be sent.

Next, second device 105 requests an IKE_AUTH 520 from first device 100 and first device 100 responds with an IKE_AUTH message 530 to the second device 105. The IKE_AUTH 525 may be retransmitted. In this IKE_AUTH sequence, an IPsec SA is set up that includes both AH and ESP features. In particular, the INTEG and ENCR transforms are set, initially in relation to the ESP. Next, an AH and ESP notification message is sent to command the transfer of the integrity algorithm from the ESP to the AH such that the AH is used in the INTEG algorithm. This way the INTEG algorithm may be set in relation to AH and ENCR may be set in relation to ESP. Thus, in this embodiment, in the IKE_AUTH: AH is used in the INTEG algorithm; and ESP is used in the ENCR algorithm. By utilizing this new AH and ESP notification message as part of the IKE Authentication sequence, the IKE process provides a quick a set up time with extended INTEG capabilities. Further, under this process, it is easy to fall back to ESP with INTEG and ENCR if expanding the INTEG transform to the AH is not supported. Adding this new notification message allows for using both AH and ESP. Support for this new notification message will need to be addressed in Internet Standards. In some embodiments, dual SAs may be utilized. A notification message to use the transport mode may also be sent.

Afterwards, information requests 535 from the second device 105 to the first device 100 may be made and information responses 540 may be transmitted back from the first device 100 to the second device 105. In this way, information exchanges between the first and second devices 100 and 105 may occur based upon the IPsec SA. It should be appreciated that this IKE process provides a quick a set up time with extended INTEG capabilities and the SA may fall back to ESP with INTEG if support is not provided. In some embodiments, dual SAs may be utilized. Also, it should be appreciated that processor 102 of first device 100 may be configured to perform the previously described IKE process with second device 105 (via interfaces 130 and link 151) and likewise the processor 102 of second device 105 may be configured to perform the previously described IKE process with the first device 100 based upon interaction with the first device via interface 130 and link 151 such that the IKE based SA process is successful and information may be exchanged between the first and second device 100 and 105 based upon the established IPsec SA.

It should be appreciated that, as an example, the previously described IKE processes may be configured to conform to Internet Protocol version 6 IPsec standards.

Adding a new mode to IKEv2 to allow for using both AH and ESP when using IPv6 mimics the configuration of ESP with authentication and integrity protection, but implies the authentication is to be done at the packet level to protect other non-mutable IP headers rather than at the ESP payload level. This allows for simplified IKEv2 IPsec initialization with the ability to do both AH with ESP on IPv6.

Embodiments of the previously described IKE processes leverage IPv6 with native IPsec protocols. In particular, it should be appreciated that AH and ESP features are native to IPv6 and can be used with the previously described IKE processes. Additionally, under the previously described IKE process, as to Transport Mode IPsec for endpoint to endpoint transactions, benefits are provided. The Authentication Header (AH): Ensures full packet integrity and origin authenticity (ICV); Identifies security parameters (SPI); and prevents replay (SQN). Also, the Encapsulating Security Payload (ESP) ensures data confidentiality when using recommended AES-256 encryption. Moreover, Internet Key Exchange (IKEv2) may be used to negotiate keys and parameters based on recommended best practices, such as: server endpoints with DNSsec verified FQDNs and DNS-based Authentication of Named Entities (DANE) verified X.509 certs, clients endpoints with a verifiable source address and Certificate Authority (CA) verifiable X.509 certs keys stored in a secure element, and IPsec Security Association shared secrets stored in a secure element.

It should be appreciated that aspects previously described may be implemented in conjunction with the execution of instructions by processors (e.g., processors 102) of the devices (e.g., first and second devices 100 and 105), as previously described. Particularly, circuitry of the devices, including but not limited to processors, may operate under the control of a program, routine, or the execution of instructions to execute methods or processes in accordance with embodiments described (e.g., the processes and functions of FIGS. 2-5). For example, such a program may be implemented in firmware or software (e.g. stored in memory and/or other locations) and may be implemented by processors and/or other circuitry of the devices. Further, it should be appreciated that the terms device, processor, microprocessor, circuitry, controller, SoC, etc., refer to any type of logic or circuitry capable of executing logic, commands, instructions, software, firmware, functionality, etc.

It should be appreciated that when the devices are wireless devices that they may communicate via one or more wireless communication links (e.g., link 151) through a wireless network that are based on or otherwise support any suitable wireless communication technology. For example, in some aspects the wireless device and other devices may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, 3G, LTE, Advanced LTE, 4G, 5G, CDMA, TDMA, OFDM, OFDMA, WiMAX, and WiFi. Similarly, a wireless device may support or otherwise use one or more of a variety of corresponding modulation or multiplexing schemes. A wireless device may thus include appropriate components (e.g., communication subsystems/interfaces (e.g., air interfaces)) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a wireless device may therefore wirelessly communicate with other mobile devices, cell phones, other wired and wireless computers, Internet web-sites, etc.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), a tablet, a wearable device, an Internet of Things (IoT) device, a mobile computer, a laptop computer, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a wired computer, a fixed computer, a desktop computer, a server, a point-of-sale device, a set-top box, or any other type of computing device. These devices may have different power and data requirements.

In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a WiFi station) to access the other network or some other functionality.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, firmware, or combinations of both. To clearly illustrate this interchangeability of hardware, firmware, or software, various illustrative components, blocks, modules, circuits, and steps have been described above generally in terms of their functionality. Whether such functionality is implemented as hardware, firmware, or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA), a system on a chip (SoC), or other programmable logic device, discrete gate or transistor logic, discrete hardware components, or any combination thereof designed to perform the functions described herein. A general purpose processor may be a microprocessor or may be any type of processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in firmware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method comprising:
    performing an Internet Key Exchange (IKE) to create an Internet Protocol security (IPsec) security association (SA) between a first device and a second device based upon both an authentication header (AH) and an encapsulating security payload (ESP), free of creating a child security association, wherein the first device and the second device are configured to communicate through a link; and allowing information exchanges between the first device and the second device via the link based upon the IPsec SA.

2. The method of claim 1, wherein creating the IPsec SA further comprises performing an IKE authentication sequence between the first device and the second device to establish the IPsec SA utilizing both the AH and the ESP.

3. The method of claim 2, wherein the IKE authentication sequence further comprises the IPsec SA:
utilizing an integrity algorithm in the AH;
utilizing an extended sequence number in the AH; and
utilizing an encryption algorithm in the ESP.

4. The method of claim 2, wherein the IKE authentication sequence further comprises the IPsec SA:
utilizing an integrity algorithm in the AH; and
utilizing an encryption algorithm in the ESP.

5. The method of claim 2, wherein the IPsec SA is based upon an AH and ESP mode in the IKE authentication sequence to indicate use of both the AH and the ESP.

6. The method of claim 2, further comprising transmitting an AH and ESP notification message to command the transfer of the integrity algorithm from the ESP to the AH.

7. A first device comprising:
an interface; and
a processor coupled to the interface, the processor configured to:
perform an Internet Key Exchange (IKE) to create an Internet Protocol security (IPsec) security association (SA) via a link with a second device based upon both an authentication header (AH) and an encapsulating security payload (ESP), free of creating a child security association; and
allow information exchanges with the second device via the link based upon the IPsec SA through the interface.

8. The first device of claim 7, wherein creating the IPsec SA performed by the processor includes the processor further configured to:
perform an IKE authentication sequence with the second device to establish the IPsec SA utilizing both the AH and ESP.

9. The first device of claim 8, wherein the IKE authentication sequence to establish the IPsec SA performed by the processor includes the processor further configured to:
utilize an integrity algorithm in the AH;
utilize an extended sequence number in the AH; and
utilize an encryption algorithm in the ESP.

10. The first device of claim 8, wherein the IKE authentication sequence to establish the IPsec SA performed by the processor includes the processor further configured to:
utilize an integrity algorithm in the AH; and
utilize an encryption algorithm in the ESP.

11. The first device of claim 8, wherein the IPsec SA is based upon an AH and ESP mode in the IKE authentication sequence to indicate use of both the AH and the ESP.

12. The first device of claim 8, wherein the processor is further configured to transmit an AH and ESP notification message to command the transfer of the integrity algorithm from the ESP to the AH.

13. A first device comprising:
means for performing an Internet Key Exchange (IKE) to create an Internet Protocol security (IPsec) security association (SA) via a link with a second device based upon both an authentication header (AH) and an encapsulating security payload (ESP), free of creating a child security association; and
means for allowing information exchanges between the first device and the second device via the link based upon the IPsec SA.

14. The first device of claim 13, wherein creating the IPsec SA further comprises means for performing an IKE authentication sequence between the first device and the second device to establish the IPsec SA utilizing both the AH and ESP.

15. The first device of claim 14, wherein the IKE authentication sequence further comprises:
means for utilizing an integrity algorithm in the AH;
means for utilizing an extended sequence number in the AH; and
means for utilizing an encryption algorithm in the ESP.

16. The first device of claim 14, wherein the IKE authentication sequence further comprises:
means for utilizing an integrity algorithm in the AH; and
means for utilizing an encryption algorithm in the ESP.

17. The first device of claim 14, wherein the IPsec SA is based upon an AH and ESP mode in the IKE authentication sequence to indicate use of both the AH and the ESP.

18. The first device of claim 14, further comprising means for transmitting an AH and ESP notification message to command the transfer of the integrity algorithm from the ESP to the AH.

19. A non-transitory computer-readable medium including code that, when executed by a processor of a first device, causes the processor to:
perform an Internet Key Exchange (IKE) to create an Internet Protocol security (IPsec) security association (SA) via a link with a second device based upon both an authentication header (AH) and an encapsulating security payload (ESP), free of creating a child security association; and
allow information exchanges between the first device and the second device via the link based upon the IPsec SA.

20. The computer-readable medium of claim 19, wherein the IPsec SA further comprises code to:
perform an IKE authentication sequence between the first device and the second device to establish the IPsec SA utilizing both the AH and ESP.

21. The computer-readable medium of claim 20, wherein the IKE authentication sequence to establish the IPsec SA further comprises code to:
utilize an integrity algorithm in the AH;
utilize an extended sequence number in the AH; and
utilize an encryption algorithm in the ESP.

22. The computer-readable medium of claim 20, wherein the IKE authentication sequence to establish the IPsec SA further comprises code to:
utilize an integrity algorithm in the AH; and
utilize an encryption algorithm in the ESP.

23. The computer-readable medium of claim 20, wherein the IPsec SA is based upon an AH and ESP mode in the IKE authentication sequence to indicate use of both the AH and the ESP.

24. The computer-readable medium of claim 20, further comprising code to command transmitting an AH and ESP notification message to command the transfer of the integrity algorithm from the ESP to the AH.

25. The method of claim 2, wherein the IKE authentication sequence further comprises utilizing a Diffie-Hellman group in the AH and the ESP.

* * * * *